United States Patent [19]

LaPointe et al.

[11] Patent Number: 5,747,965
[45] Date of Patent: May 5, 1998

[54] BATTERY PACK FOR POWERED MOTION FURNITURE

[75] Inventors: Larry P. LaPointe, Temperance; Jonathan R. Saul, Erie, both of Mich.

[73] Assignee: La-Z-Boy Incorporated, Monroe, Mich.

[21] Appl. No.: 613,588

[22] Filed: Mar. 12, 1996

[51] Int. Cl.$^6$ .......................... H01M 10/46; H01M 2/10; B60K 1/00
[52] U.S. Cl. .................. 320/5; 320/2; 429/99; 180/65.1
[58] Field of Search .................. 180/65.1, 907; 280/230, 657; 320/2, 5, 6, 15; 429/96, 99, 100, 149, 151, 152, 153; D13/103, 104

[56] References Cited

U.S. PATENT DOCUMENTS

| | | |
|---|---|---|
| 3,111,181 | 11/1963 | Yatich. |
| 3,846,179 | 11/1974 | Shaw. |
| 3,933,522 | 1/1976 | Steig. |
| 4,113,926 | 9/1978 | McBrien. |
| 4,231,614 | 11/1980 | Shaffer. |
| 4,407,543 | 10/1983 | Mashuda. |
| 4,655,471 | 4/1987 | Peek. |
| 5,036,938 | 8/1991 | Blount et al. ............ 180/65.1 X |
| 5,044,647 | 9/1991 | Patterson. |
| 5,193,633 | 3/1993 | Ezenwa. |
| 5,297,021 | 3/1994 | Koerlin et al.. |
| 5,304,434 | 4/1994 | Stone. |
| 5,366,036 | 11/1994 | Perry. |
| 5,437,939 | 8/1995 | Beckley. |
| 5,441,123 | 8/1995 | Beckley. |
| 5,497,066 | 3/1996 | Drouillard et al. ............ 320/5 X |
| 5,531,284 | 7/1996 | Okamoto ................... 180/65.1 |
| 5,592,997 | 1/1997 | Ball ........................... 180/65.1 |

Primary Examiner—Peter S. Wong
Assistant Examiner—Patrick B. Law
Attorney, Agent, or Firm—Harness, Dickey & Pierce, P.L.C.

[57] ABSTRACT

A battery pack for providing a standby power source for use with powered motion furniture having an electric motor. The battery pack includes a housing defining a cavity within which a first battery and a second battery are disposed and electrically connected in series, a circuit board for regulating the charging and discharging of the first and second batteries, and a support member for securing the circuit board within the cavity. An umbilical cord is electrically connected to the circuit board and is electrically connectable to the electric motor in order to provide power to charge the first and second batteries when the electric motor is connected to a power source. Alternatively, when the electric motor is not connected to an operative power source, the batteries power the electric motor through the umbilical cord connection. The support member preferably consists of a spacer plate having a plate-like body portion defining a cut-out communicable with the positive or negative terminals of the first battery as well as a support arrangement for securing the circuit board.

20 Claims, 4 Drawing Sheets

BATTERY PACK FOR POWERED MOTION FURNITURE

BACKGROUND OF THE INVENTION

1. Technical Field

The present invention relates generally to power-assisted furniture and, more particularly, to a battery pack for providing power to an electric motor capable of reciprocating the operative components of the power-assisted furniture.

2. Discussion

Conventionally, power-assisted furniture includes a motor operated actuation mechanism that positions the movable components of the furniture. More specifically, power-assisted furniture such as the power-assisted chair illustrated and discussed in commonly owned U.S. Pat. No. 5,466,046, issued Nov. 14, 1995 and entitled "Actuation Drive Mechanism For Power-Assisted Chairs", generally include an electric motor that is connected to the furniture frame and operative to reciprocate the movable components of the furniture piece relative to one another. While the electric motor is most commonly directly connected to an AC power source, the prior art has addressed the need to provide a standby power source capable of operating the electric motor during a power failure or like occurrence. However, prior art devices do not provide a reliable and compact standby battery power source adapted to include a self contained charging and discharging regulating circuit. Specifically, while prior art devices have been found to operate in a generally satisfactory manner, the purchaser of power-assisted furniture who desired to have a rechargeable backup power source generally must either acquire an electric motor having a charging circuit board or retrofit the existing electric motor housing to accommodate the circuit board.

SUMMARY OF THE INVENTION

Accordingly, the present invention overcomes the disadvantages associated with power-assisted furniture by providing a compact battery pack that includes a self-contained circuit board thereby allowing existing powered motion furniture to be more easily and inexpensively retrofitted with a standby power source.

In a preferred embodiment of the present invention, the battery pack for powered motion furniture includes a housing having connecting means for coupling the housing to the powered motion furniture. The housing defines a cavity within which a first battery and a second battery are disposed and electrically connected to one another in series. Support means are included within the cavity to structurally support a circuit board that is electrically connected to each of the first and second batteries and to the electric motor. The circuit board regulates the charging and discharging of the first and second batteries so as to provide a reliable standby power source for operating the power-assisted furniture.

Other features and advantages of the present invention will become apparent upon consideration of the drawings and the description set forth hereinafter.

DETAILED DESCRIPTION OF A PREFERRED EMBODIMENT

The following description, while depicting the invention as used in a power-assisted lift chair, is intended to teach one skilled in the art how to make and use the battery pack for a lift chair and other power-assisted furniture. Specifically, those skilled in the art will appreciate that the battery pack described and claimed herein may be used with other power-assisted furniture such as hospital beds and the like.

Figure 1:
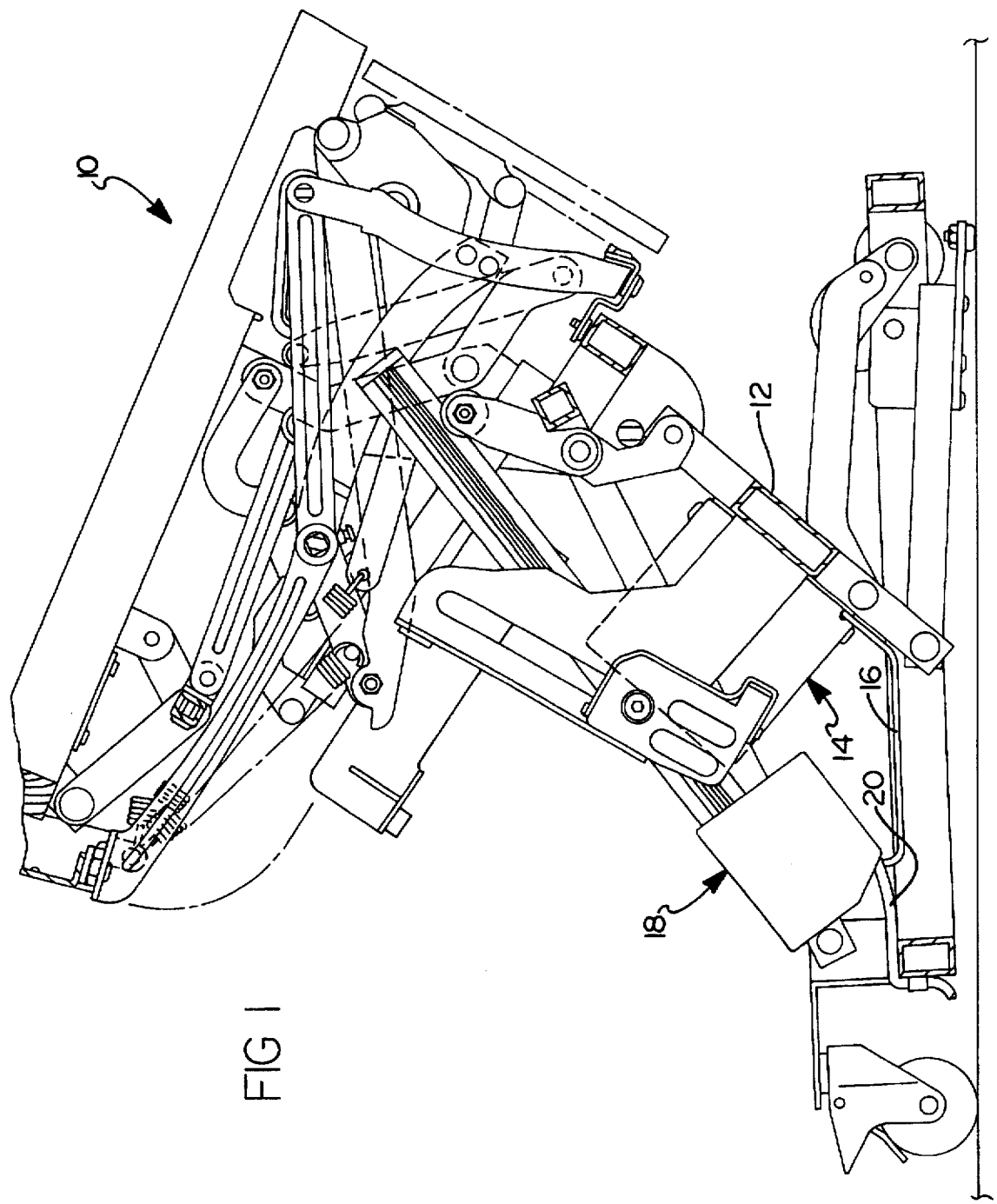
FIG. 1 is a side view of a power-assisted lift chair illustrating the battery pack connected to the frame of the chair.
Figure 2:
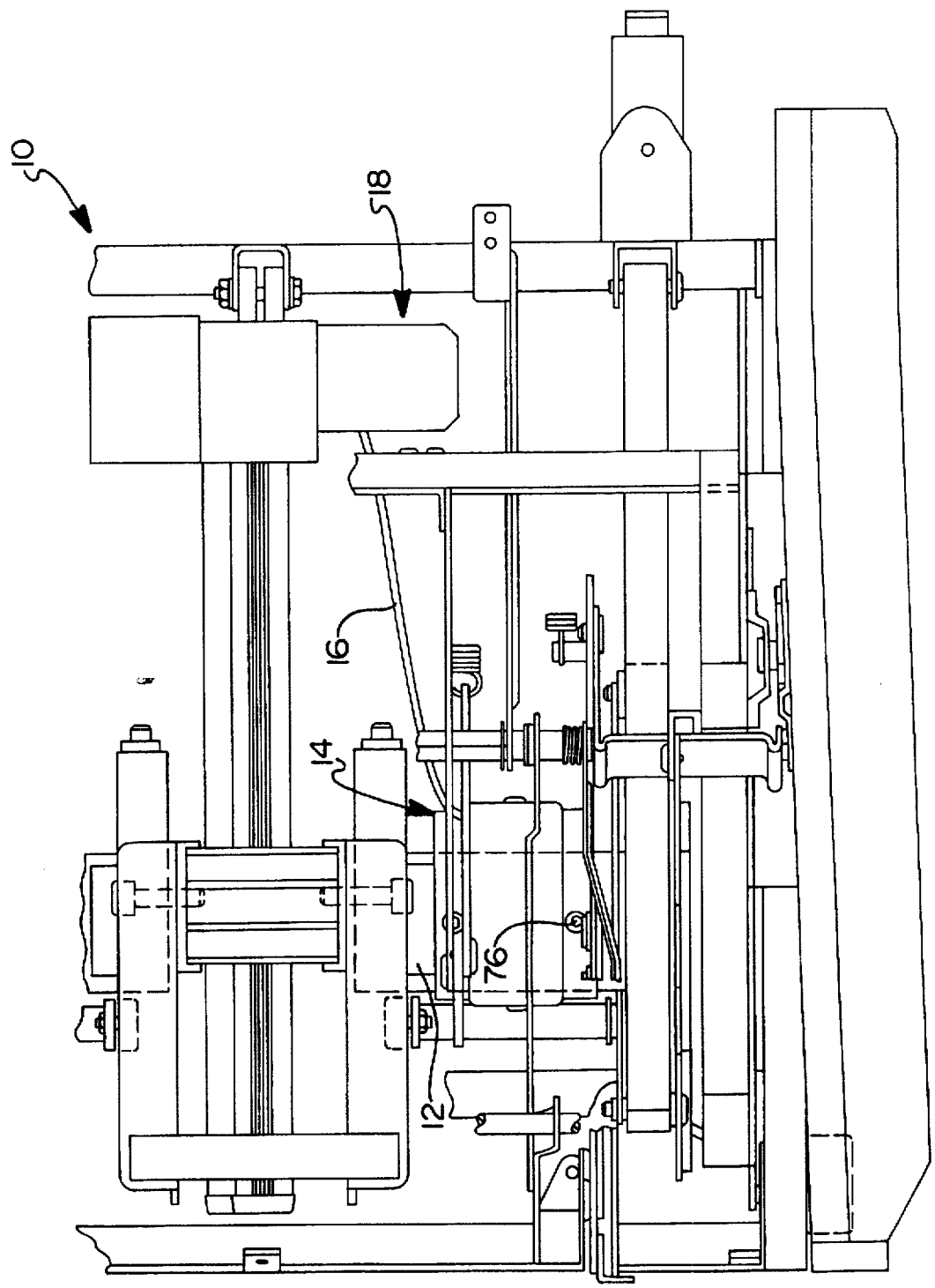
FIG. 2 is a top view of the chair and battery pack shown in FIG. 1.

A power-assisted lift chair 10 is shown in FIGS. 1 and 2 in an extended position. The components and operation of the power-assisted lift chair are not discussed in detail herein. Rather, reference may be made to commonly owned U.S. Pat. No. 5,455,046, issued Nov. 14, 1995 and entitled "Actuation Drive Mechanism For Power-Assisted Chair", for a detailed explanation and illustration of the chair. The frame of power-assisted lift chair 10 is shown to include a mounting tube 12 to which a battery pack 14 is connected. Umbilical cord 16 electrically connects battery pack 14 to an electric motor 18 that is, in turn, connected to an AC power source (not shown) through a power cord 20.

It should be appreciated by those skilled in the art that umbilical cord 16 is connected to electric motor 18 so as to allow current to flow both from electric motor 18 to battery pack 14 and in the reverse direction. Accordingly, as will be described in detail hereinafter, battery pack 14 receives a charging current through umbilical cord 16 when power cord 20 is connected to an AC power source while, alternatively, powering electric motor 18 through umbilical cord 16 when either the power cord 20 is disconnected from the power source or the power source is inoperative.

Figure 3:
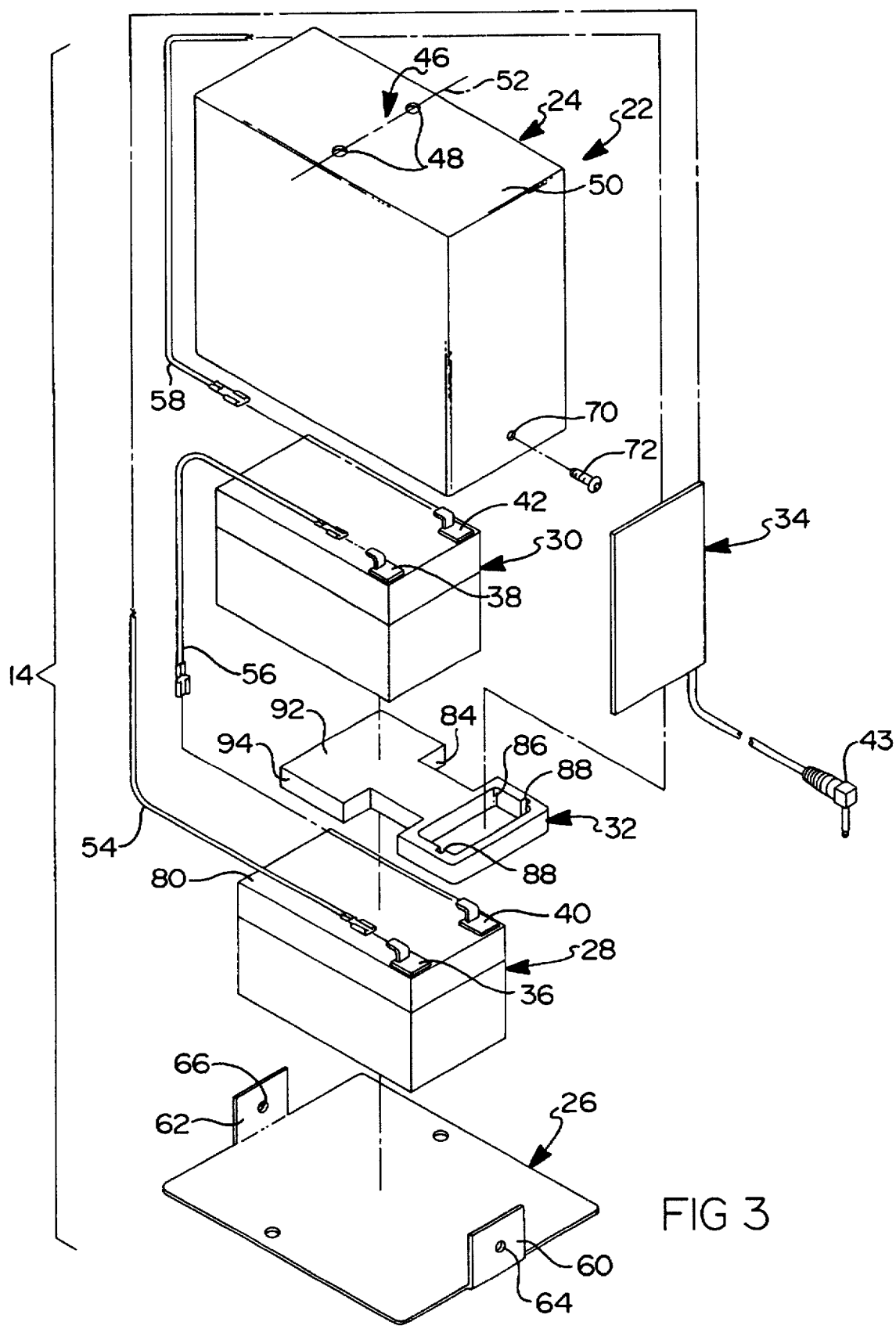
FIG. 3 is an exploded perspective view of the battery pack.

Battery pack 14 is shown in detail in FIG. 3 to include a housing 22 having a cover 24 and a base 26, first and second rechargeable batteries 28 and 30, respectively, a spacer plate 32, and a circuit board 34. First and second batteries 28 and 30, respectively, each include a positive terminal 36 and 38, respectively, and a negative terminal 40 and 42, respectively. As is illustrated in a generally schematic fashion in FIG. 3, first and second batteries 28 and 30, respectively, are connected to one another in series and electrically connected to circuit board 34 which is connected to electric motor 18 through plug fitting 43 of umbilical cord 16.

While the battery pack described and claimed herein is intended to accommodate a variety of styles and models of rechargeable batteries, it is specifically contemplated that a maintenance free, rechargeable battery such as types NP15-12 or NP24-12, manufactured by Yuasa Battery Co., Ltd. of Santa Fe Springs, Calif. be used. One of the desirable features provided by these batteries is that they include a low pressure venting system operative between 7 psi and 10 psi to release excess gas and reseal automatically in the event that the gas pressure within the batteries rises to a level above the normal level. Moreover, while it is contemplated that the batteries will be oriented in an upright configuration, the preferred batteries have a sealed construction that allows them to operate in most any position without adversely effecting the capacity of the electrolytes or the service life of the batteries. Additionally, each of the preferred batteries have a capacity such that, when connected in series, the capacity of the battery pack is sufficient to reciprocate the power-assisted chair through multiple cycles, preferably at least twenty (20) cycles, before recharging.

Figure 5:
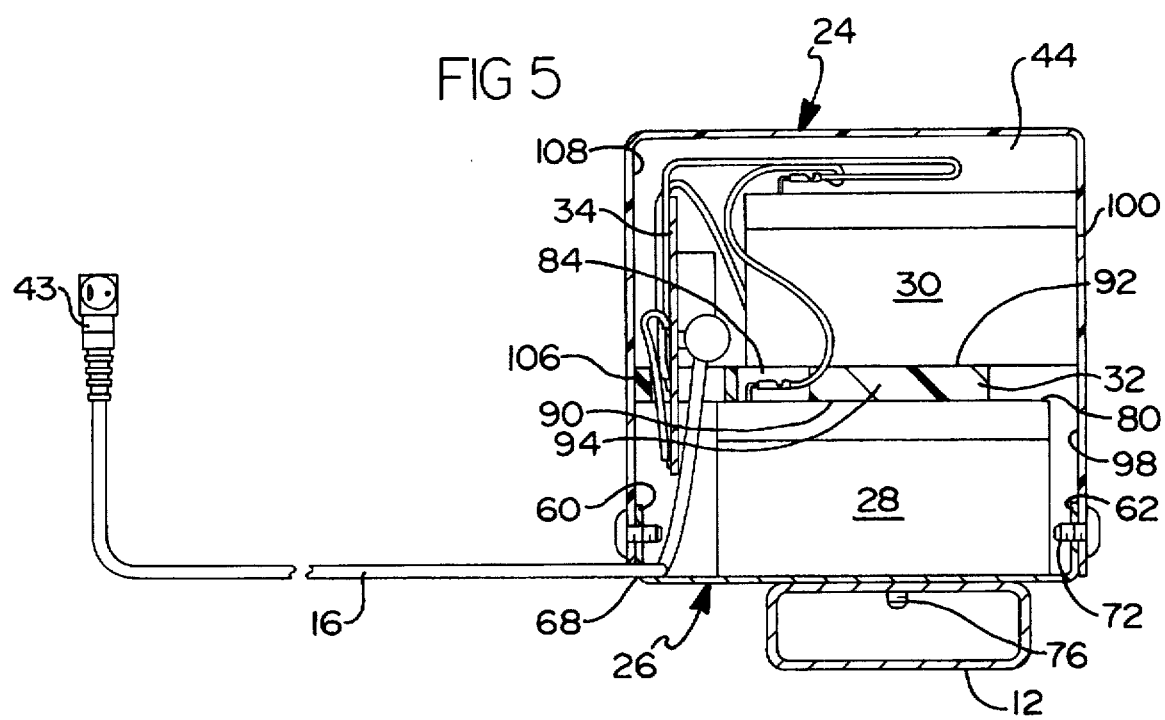
FIG. 5 is a side view of the assembled battery pack with the side panel of the housing cover removed for clarity.

As best illustrated in FIG. 5, housing cover 24 and base 26 cooperate to define a cavity 44 containing first battery 28, second battery 30, spacer plate 32, and circuit board 34. In view of the gas generation and venting characteristics provided by the preferred batteries described above, the housing cover 24 is provided with venting means 46 (FIG. 3) for circulating air from and into housing cavity 44. In the preferred embodiment, venting means 46 includes a pair of holes 48 formed in the top surface 50 of housing cover 24. Specifically, the contemplated holes are located along the transverse centerline 52 of housing cover 24 and are formed so as to have a diameter of approximately 0.045 inches.

As previously mentioned, first and second batteries 28 and 30, respectively, are connected to one another in series as shown in a generally schematic fashion in FIG. 3. Specifically, the preferred connection includes a connector wire 54 electrically connecting the positive terminal 36 of the first battery 28 to circuit board 34, a second connector wire 56 connecting the negative terminal 40 of first battery 28 to the positive terminal 38 of second battery 30, and a third connector wire 58 electrically connecting the negative terminal 42 of second battery 30 to circuit board 34. It should be appreciated that the first and second batteries can be serially connected in a manner different from that shown in FIG. 3 and, moreover, that additional batteries may be provided and connected together either serially or in parallel without departing from the scope of the invention described and claimed herein.

Housing 22 includes coupling means for connecting cover 24 to base 26 which, in the preferred embodiment, includes first and second connector plates 60 and 62 extending upwardly from base 26 and each defining an aperture 64 and 66, respectively. Cover 24 includes apertures 70 through which threaded connector bolts 72 or similar connecting members such as plastic rivets are disposed to secure cover 24 to base 26. As is most evident in FIGS. 2, 4, and 5, base 26 includes connecting means for securing housing 22 to the powered motion furniture. The preferred connecting means illustrated in the drawings includes apertures 74 formed in base 26 to cooperate with connector bolts 76 which secure battery pack 14 to the powered motion furniture such as through apertures (not shown) formed in mounting tube 12. Base 26 further includes an opening 68 through which umbilical cord 16 enters cavity 44. It should be appreciated by those skilled in the art that a variety of coupling means and/or connecting means may be used without departing from the scope of the claimed invention.

Circuit board 34 regulates the charging and discharging of first and second batteries 28 and 30, respectively, in a manner known in the art. Specifically, it is currently contemplated that the present invention include a charging/discharging circuit board manufactured by Maxwell Products of Cerritos, Calif. or an equivalent thereof. The charging circuit board should include a current sensing circuit that enables a charging circuit to provide a charging current to first and second batteries 28 and 30 when power cord 20 of electric motor 18 is connected to an operative AC power source. The charging circuit is capable of rapidly charging the battery after a deep discharge as well as providing a trickle charge to maintain the batteries in a substantially fully charged condition. The circuit board also operates to discharge current from the serially connected batteries through umbilical cord 16 when the power cord 20 is disconnected from the external AC power source.

Figure 4:
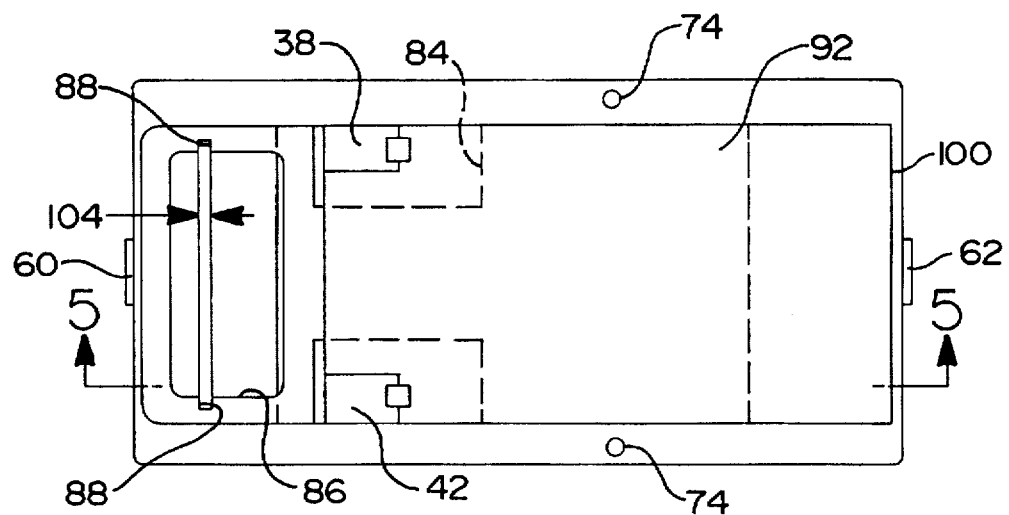
FIG. 4 is a top view of the battery pack with the cover and connecting wires removed for clarity.

Turning now to FIGS. 3-5, the preferred embodiment shown in these figures illustrates that first battery 28 is disposed upon and structurally supported by base 26 of housing 22. While base 26 is shown as a plate-like member capable of accommodating first battery 28 in a variety of positions, it is contemplated that base 26 may be formed in a variety of configurations including as a molded member having a compartment specifically sized and positioned to retain first battery 28 in a predetermined location.

Spacer plate 32, preferably formed by stamping or machining a sheet of ABS thermoplastic material such as fire retardant KJB material sold by Borg-Warner under the CYCOLAC trademark, is disposed in contacting relation with a top surface 80 of first battery 28. Spacer plate 32 generally includes cut-outs 84, an aperture 86 with a pair of opposing notches 88, a bottom surface 90, and a top surface 92. Top and bottom surfaces 90 and 92, respectively, are separated by a continuous side wall 94 of uniform height that circumscribes the periphery of spacer plate 32. It should be appreciated that the desired thickness of spacer plate 32, i.e., the length of side wall 94, is dependent in part upon the required spacing between first and second batteries 28 and 30, respectively. The recommended free air space between the preferred NP15-12 or NP24-12 batteries by Yuasa Battery Co. is 0.02 to 0.04 inches.

As best seen in FIGS. 4 and 5, spacer plate 32 is positioned relative to first battery 28 such that cut-outs 84 accommodate the positive and negative battery terminals, 36 and 40, respectively, of first battery 28. The cut-outs 84 allow spacer plate bottom surface 90 to contact top surface 80 of first battery 28. While the drawings illustrate that the positive and negative battery terminals 36, 38, 40, and 42 of first and second batteries 28 and 30, respectively, are comprised of tab type terminals such as the Faston Tab 250 terminals included with Yuasa battery NP15-12, one skilled in the art will appreciate that bolt type terminals such as those included with Yuasa battery NP24-12 may also be used.

Second battery 30 is positioned above first battery 28 and rests upon upper surface 92 of spacer plate 32 whereby first and second batteries 28 and 30, respectively, are disposed in a vertically stacked arrangement separated by spacer plate 32. In the preferred embodiment, first battery 28 is offset forwardly of a rear wall 98 of cover 24 in order to accommodate the portion of connector bolts 72 that extend into housing cavity 44. Conversely, a rear surface 100 of second battery 30 is in close proximity to or in contacting relationship with rear wall 98. It should be appreciated by those skilled in the art that first and second batteries 28 and 30, respectively, can be fixedly secured in their respective positions relative to housing 22 by means known in the art.

With reference to FIGS. 3 and 4, support means for securing circuit board 34 within housing cavity 44 preferably includes opposing notches 88 formed in first aperture 86 of spacer plate 32. Each of the opposing notches 88 are sized such that the opposing notch walls are spaced from one another a distance equal to or slightly larger than the thickness 104 of circuit board 34 (FIG. 4). Accordingly, the walls defining notch 88 frictionally engage and support circuit board 34 therebetween while aperture 86 is sized so as to accommodate the operative components of circuit board 34 as well as to provide the necessary clearance to connect connector wires 54 and 58, umbilical cord 16, and any other necessary components thereto (FIG. 5). As further shown in FIG. 5, the preferred arrangement of spacer plate 32 within housing cavity 44 is that a front surface 106 of spacer plate 32 contacts a front wall 108 of cover 24. It will be appreciated that variations to the specific orientation and structure of spacer plate 32 and circuit board 34 may be made by those skilled in the art without departing from the scope of the appended claims.

It should further be appreciated that the battery pack for powered motion furniture described herein provides a compact and durable reserve power system for powered motion furniture. By providing the charging circuit board within the battery pack housing, the present invention allows existing powered motion furniture to be more easily and inexpensively retrofitted with the present invention.

The foregoing discussion discloses and describes merely an exemplary embodiment of the present invention. One skilled in the art will readily recognize from such description, and from the accompanying drawings and claims, that various changes, modifications and variations can be made therein without departing from the spirit and scope of the invention as described in the following claims.

What is claimed is:

1. A battery pack for use with an electric motor, said battery pack comprising:

a housing defining a cavity;

a first battery disposed within said cavity;

a second battery disposed within said cavity and electrically connected in series with said first battery, said first and second batteries being in a vertically stacked arrangement;

a circuit board for regulating the charging and discharging of said first and second batteries, said circuit board electrically connected to each of said first and second batteries and electrically connectable to the electric motor; and support means disposed in said cavity for securing said circuit board within said cavity.

2. The battery pack of claim 1 wherein said first battery and said second battery are separated by said support means.

3. The battery pack of claim 2 wherein said support means is a plate-like member disposed between said first and second batteries.

4. The battery pack of claim 3 wherein said plate-like member includes a first aperture, at least a portion of the plate-like member surrounding said first aperture frictionally supporting said circuit board within said first aperture.

5. The battery pack of claim 4 wherein said first aperture defines a pair of opposed notches frictionally engageable with the circuit board.

6. The battery pack of claim 1 wherein said housing includes a base and a cover, said first battery supported by said base.

7. The battery pack of claim 6 wherein said cover includes a vent communicating with said housing cavity.

8. A battery pack for use with powered motion furniture, said powered motion furniture including a first component movable relative to a second component, and an electric motor connectable to a power source, said electric motor having a drive member coupled to said first component and a power supply cord electrically connectable to a power source, said battery pack comprising:

a housing defining a cavity, said housing including connecting means for coupling said housing to the powered motion furniture;

a first battery disposed within said cavity;

a second battery disposed within said cavity and electrically connected with said first battery;

a circuit board for regulating the charging and discharging of said first and second batteries, said circuit board electrically connected to each of said first and second batteries and electrically connectable to the electric motor;

support means disposed in said cavity for securing said circuit board within said cavity; and an umbilical cord electrically connected to said circuit board and connectable to the electric motor, said circuit board regulating the charging and discharging of said first and second batteries by selectively permitting a battery charging current to flow through said umbilical cord from the electric motor to said first and second batteries and a battery discharging current to flow through said umbilical cord from said first and second batteries to the electric motor.

9. The battery pack of claim 8 wherein said housing includes a base and a cover, said first battery supported by said base.

10. The battery pack of claim 9 wherein said cover includes a vent communicating with said housing cavity.

11. The battery pack of claim 8 wherein said first battery and said second battery are in a vertically stacked arrangement.

12. The battery pack of Claim 11 wherein said first battery and said second battery are separated by said support means.

13. A battery pack for use with powered motion furniture having an electric motor, said battery pack comprising:

a housing having a base, a cover, and coupling means for connecting said cover to said base to define a housing cavity therebetween, said base forming a battery support surface;

connecting means for securing said housing to the powered motion furniture;

a first battery disposed within said housing cavity and supported by said battery support surface;

a second battery disposed within said housing cavity and supported by said first battery;

a circuit board for regulating the charging and discharging of said first and second batteries, said circuit board electrically connected to each of the electric motor, said first battery and said second battery, said first and second batteries being electrically connected to one another in series;

a spacer plate disposed between said first battery and said second battery whereby said first and second batteries are disposed in a vertically stacked arrangement separated by said spacer plate and supported by said battery support surface, said spacer plate defining support means for securing said circuit board within said housing cavity.

14. The battery pack of claim 13 wherein said support means for securing said circuit board includes a first aperture defined in said spacer plate, at least a portion of the spacer plate surrounding said first aperture frictionally supporting said circuit board within said first aperture.

15. The battery pack of claim 14 wherein said first aperture defines a pair of opposed notches frictionally engagable with said circuit board.

16. The battery pack of claim 15 wherein said spacer plate includes a first surface and a second surface, said first surface contacting a top surface of said first battery, said second surface contacting a bottom surface of said second battery.

17. The battery pack of claim 16 wherein said first battery includes a positive and negative terminal extending from said top surface, said spacer plate further defining a first cut-out accommodating said positive terminal of said first battery and a second cutout accommodating said negative terminal of said first battery.

18. The battery pack of claim 13 wherein said cover further includes a vent communicating with said housing cavity thereby allowing air to circulate from and into said housing cavity.

19. The battery pack of claim 13 wherein said coupling means for connecting said cover to said base includes first and second connecting plates extending upwardly from said base, each of said first and second connecting plates having a first mounting aperture formed therein, said cover defining second mounting apertures, said coupling means further including bolts cooperating with said first mounting apertures and said second mounting apertures to connect said cover to said base.

20. The battery pack of claim 13 further including an umbilical cord electrically connecting said circuit board to the electric motor.

* * * * *